H. F. MARANVILLE.
FILTER.
APPLICATION FILED JUNE 29, 1910.
1,054,702.
Patented Mar. 4, 1913.
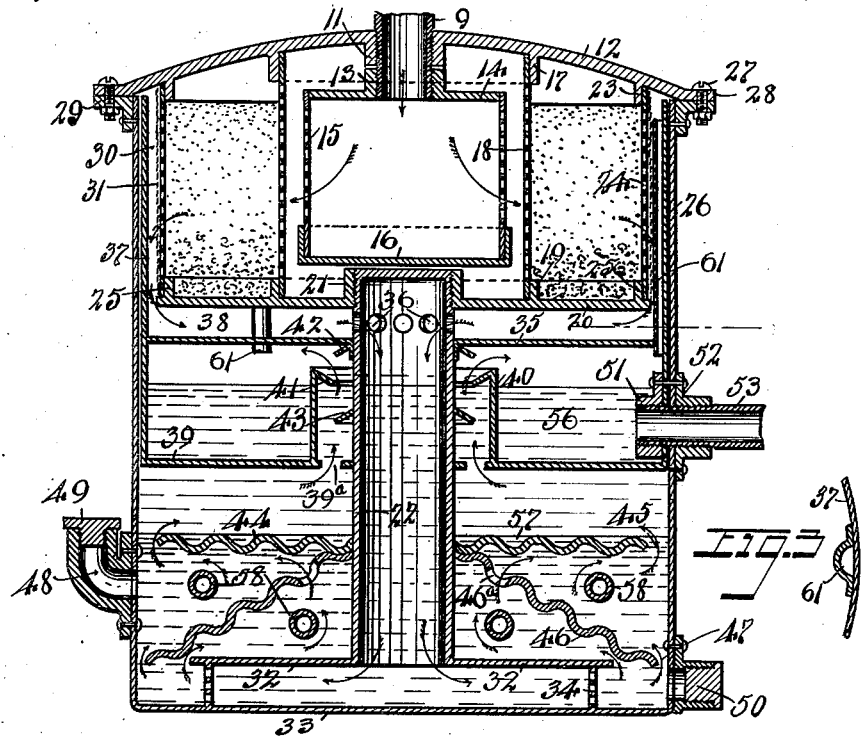

UNITED STATES PATENT OFFICE.

HARVEY F. MARANVILLE, OF AKRON, OHIO.

FILTER.

1,054,702.

Specification of Letters Patent. Patented Mar. 4, 1913.

Application filed June 29, 1910. Serial No. 569,459.

*To all whom it may concern:*

Be it known that I, HARVEY F. MARANVILLE, a citizen of the United States, residing at Akron, in the county of Summit and State of Ohio, have invented a certain new and useful Improvement in Filters, of which the following is a full, clear, and exact description, reference being had to the accompanying drawings.
This invention relates to oil filters and, in the embodiment shown herein, has in view the filtering of oil for use with motor vehicles. In the form of filters shown herein, means are provided whereby the sediment may be effectively removed from the oil, the oil washed, cooled and stored for distribution. In addition, provision is made for preventing, in a moving vehicle, any access of the water by means of which the oil is washed and cooled, into the storage chamber of the filter.

With the accomplishment of the foregoing objects in view, the invention may be defined further as consisting of the combinations of elements and parts embodied in the claims hereto annexed and illustrated in the drawings forming part hereof, wherein—

Figure 1 represents a vertical sectional view through a filter constructed in accordance with my invention; Fig. 2 is a side elevation of a multi-cylinder engine, illustrating the manner in which the filter is used in connection therewith; and Fig. 3 a sectional detail on the line 3—3 of Fig. 1.

The filter shown herein is substantially the same as that disclosed in my application #545,742, filed February 24, 1910, being largely a division of said application.
Describing the parts, by reference characters, 1 denotes the hood, 2 the dash and 3 the front wheel of an automobile. Within the hood and supported in any suitable manner, is a multi-cylinder engine, the individual cylinders of which are shown at 4. The engine base is substantially the same as shown in the aforesaid application, comprising generally an upper section 5 and a lower detachable section carrying a receptacle 6 provided with a filling connection 7, said receptacle communicating with a pump 8 which is connected by the pipe 9 with the upper part of the filter, designated generally by the reference numeral 10. The pipe 9 is conveniently threaded into the central boss 11 carried by the removable cover 12 of the filter tank. The end of this pipe is shown as extending through this boss and threaded in turn into a boss 13 on the cover 14 of an internal strainer having a perforated metallic cylindrical wall 15 extending between said cover and a sediment pan 16 and forming a screen. Outside of the central boss 11, the cover 12 is provided with a circular rib 17 forming a support for the upper end of the perforated metal screen 18 located outside of the metal screen 15. The lower end of the screen 18 engages a circular rib 19 projecting upwardly from a plate 20. This plate is provided with a central internally threaded boss 21 which receives the upper threaded end of a pipe 22.

Near its outer periphery, the cover 12 is provided with a circular rib 23 forming a support for the upper end of a perforated metal screen 24, the lower end of which engages the up-turned flange or rib 25 at the outer periphery of the plate 20. The cover 12 is conveniently secured to the casing 26 by means of bolts 27 extending through a flange 28 at the outer periphery of the cover and the horizontal flange 29 of an angle iron which is secured to the upper end of the casing 26. Between the casing 26 and the screen 24 a space 30 is provided and the screen 24 is covered with a fine-meshed cloth 31.

The bottom of the central tube 22 is supported by a plate 32 of less diameter than the diameter of the casing 26 and supported, from the bottom 33 of said casing, by means of a perforated cylindrical metallic screen 34, the screen being carried by said plate. The upper end of the tube 22 is provided, below the plate 20 and above a plate 35, with a series of perforations 36. The plate 35 is soldered to the tube 22 and to an annular wall 37 located within the casing 26 and in proximity thereto, a passageway 38 being formed between the plates 20 and 35.

39 denotes a plate located below the plate 35 and extending substantially parallel therewith and from the wall 37 to the tube 22. The plate 39 is provided, adjacent to the tube 22, with a plurality of openings 39ª. A sleeve or casing 40 projects upwardly from the plate 39, outside the openings 39ª, and forms a vertical passageway with the tube 22. The upper end of the casing 40 is provided with a downwardly extending baffle 41, while the tube 22 is provided with downwardly extending baffles 42 and 43 located, respectively, below and above the baffle 41. The baffles 42 and 43 may be conveniently soldered to the tube 22.

44 denotes a plate also carried by the tube 22 above and substantially parallel with the plate 32. This plate is preferably corrugated, as shown and extends outwardly from the tube 22 and has its outer edge spaced a short distance from the casing 26 to form a narrow passageway 45 therewith.

46 denotes a frusto-conical deflecting plate which is also preferably corrugated and the upper end of which is secured to the tube 22, as by soldering, the lower end extending downwardly nearly as far as the plate 32 and spaced a comparatively short distance from the casing 26 to form a passageway 47 therewith. The filling tube 48 extends upwardly from the space formed below the plate 44 and is provided with a plug 49. At its lower end, the casing 26 is provided with a clean-out opening provided with a plug 50, for the removal of any matter that may settle at the bottom of the casing through the washing of the oil.

The portion of the apparatus which is provided above the plate 20 is for the purpose of filtering the oil which is pumped through the pipe 9. The space between the perforated screens 18 and 24 is filled with a suitable filtering material, as bone black, and the cloth 31 is applied to the outer surface of the metallic screen 24. The annular receptacle formed between the cylindrical casing 40 and the casing 37 is provided with an internally threaded boss 51 secured to the wall of the casing 37. A similar boss 52 is attached to the casing 26 and a nipple 53 is threaded through both of said bosses. The outer end of the nipple is detachably connected to a manifold 54, from which pipes 55 extend through the wall of the upper section 5 of the engine base. As will appear from Fig. 1, the outlet nipple 53 is of less sectional area than the pipe 9, a convenient size of these pipes being ½" for the pipe 9 and ⅜" for the nipple 53. The purpose of this construction is to cause the oil to leave the storage chamber 56 less rapidly than the oil is fed into the filtering chamber and thus preserve a level of oil in the chamber 56 when the engine is running. Having the pipe 9 and nipple 53 of different areas is but one way of accomplishing the desired result; other means might be used which would be within the scope of my invention.

The lower portion of the casing 26 is a water chamber, receiving water through the filling tube 48. The level of the water in this chamber is indicated by the dotted line 57. In winter a non-freezing mixture of glycerin and water may be employed.

The oil used in an explosive engine becomes greatly heated, and hence the water which washes the oil in the filter will likewise become heated. For the purpose of cooling the oil and water, I provide air pipes or conduits 58 which pass through the water chamber. These conduits may assume any form desired, but are so arranged that the water and oil will flow all around the same, while the air which passes through the pipes or conduits will conduct away the heat.

The annular chamber formed between the cylindrical wall 40 and the wall or casing 37 is a receptacle for the filtered oil, the bottom of which is formed by the plate 39.

59 denotes a gage which is connected by means of a suitable pipe 60 with the filtered oil or storage chamber 56 or receptacle in the casing 26.

With the parts arranged as above described, the operation is as follows: Oil accumulating in the receptacle 6 is pumped through the pipe 9 into the first filter chamber. The oil is partly filtered in the first filter chamber in passing through the screen 15 and much of the sediment removed therefrom; thence it passes through the screens 18 and 24 and the bone black filling therebetween, thus being nearly completely filtered and having the fats and heavy substances removed therefrom. The final filtering is accomplished by the cloth 31. The oil as delivered from the crank case to the filter is hot, and the hot, clean oil flows through the passageway 38, openings 36 and tube 22 into the space beneath the plate 32. It passes under pressure through the screen 34, around the outer edge of plate 32, where it divides, part passing through the openings 46ª in the plate 46 and part through the space 47 provided between the periphery of the plate 46 and the casing, finally passing through the peripheral passageway 45 above the water level, being efficiently washed and cooled in passing through the water, the corrugations in the plates 44 and 46 facilitating this result. Still under pressure it rises through the openings 39ª into the annular passageway formed between the tube 22 and the cylindrical wall 40 and overflows into the storage chamber 56. The particular arrangement of the plates 32, 44 and 46 provides a tortuous passageway for the oil, the effective length of which is increased by the corrugations in said plates, and causes the oil to be effectively washed and cooled in its passage through the water. The baffles 41, 42 and 43 prevent any water from being thrown into the storage chamber 56 through the vertical movement given the casing 26 in the operation of the automobile. By merely disconnecting the sections of the pipe 9 (as by the union coupling 9ª) and removing the cover 12, the filter chamber defined by the cover 14, pan 16 and screen 15 may be removed. The pan can then be removed from the lower end of the screen 15 and the sediment dumped.

If desired, after the cover 12 is removed, by unscrewing the nipple 53, the casing 37 may be lifted out and with it everything within the casing 26 and the working parts of the filter, washer, and cooler may be readily cleaned. The outer filtering chamber, being supported by the plate 20, may be removed with said plate by merely unscrewing the latter from the tube 22.

As previously stated, a mixture of water and glycerin may be employed in the washing and cooling chamber, such mixture forming a non-freezing mixture. However, as some users are apt to use water alone in such chamber, I provide means whereby, in the event of the freezing of the water, the operation of the apparatus will not be stopped. A suitable number of tubes 61 are provided which extend upwardly from the plate 35 into the annular passageway 30, the upper ends of these tubes being a short distance below the flange 23 of the cover. These tubes may be conveniently cast with or formed with the casing 37. Should the flow of oil into the water chamber be checked or hindered or, for any other reason, the oil accumulates in the annular passageway 30, such oil will overflow the tops of the tubes and thus enter the storage and distributing chamber 56, which will enable the supply of filtered oil to be maintained.

Having thus described my invention, what I claim is:

1. In a combined oil filtering, washing and cooling apparatus, the combination of a filtering device, a water chamber below the said device, a storage chamber intermediate of the filtering device and the water chamber, means for conducting filtered oil from the filtering device below the surface of the water in the water chamber, there being a vertically extending passageway connecting the water chamber with the storage chamber, and baffles in said passageway, preventing upward movement of the water from said water chamber to said storage chamber.

2. In a combined filtering, washing and cooling apparatus, the combination of a casing, a filtering device in the upper portion of said casing, a water chamber in the lower portion of said casing, a tube extending downwardly from the filtering device below the surface of the water in said chamber, an annular storage receptacle interposed between the filtering device and the water chamber and having its inner wall surrounding said tube and provided with a downwardly projecting baffle at the upper end thereof, and downwardly projecting baffles carried by said tube and coöperating with the first mentioned baffle to prevent water being carried up into the storage chamber.

3. In a combined filtering, washing and cooling apparatus, the combination of a filtering device, a water chamber below said device, a tube extending downwardly from the filtering device below the surface of the water in said chamber, and an annular storage receptacle interposed between the filtering device and the water chamber and having its inner wall surrounding said tube and provided with a downwardly projecting baffle.

4. In a filtering, washing and cooling apparatus, the combination of a casing, a filter chamber in the upper portion of said casing, said chamber having a screen spaced from the casing wall to provide a passageway therewith, a water chamber in said casing below said filter chamber, a storage and distributing chamber interposed between the filter and the latter chamber, connections whereby filtered oil may be supplied to said water chamber and thence into the distributing and storage chamber, and means whereby oil accumulating in the passageway between the screen and the casing may flow directly into the distributing and storage chamber, in case the water in the water chamber should freeze.

5. In a filtering, washing and cooling apparatus, the combination of a casing, a filtering device in the upper portion thereof, a water chamber below said device, a storing and distributing chamber intermediate between the filtering device and the former chamber, there being a passageway extending from the filtering device to the said water chamber and a passageway from said chamber to the storage and distributing chamber, and a pipe communicating with the last mentioned chamber and projecting into the first mentioned passageway above the bottom thereof.

6. In a filtering, washing and cooling apparatus, the combination of a casing, a second casing within the former casing and having a bottom plate and a plate substantially parallel with the bottom plate, a tube secured to the central portion of said plates and projecting therethrough, a cylindrical wall projecting upwardly from the bottom plate and forming an annular chamber with the second casing, a filtering chamber within the upper portion of the second casing, said filtering chamber having a bottom secured to said pipe and forming with the upper plate within the second casing a passageway, and said tube being provided with one or more perforations in said passageway, a cover for the first mentioned casing, and a supply connection projecting through said cover and into the filter.

7. In a filtering apparatus, the combination of a casing, a supporting member within said casing, a filtering device within the upper portion of said casing and comprising a bottom plate detachably connected to the supporting member, inner and outer screens supported by the bottom plate providing an annular filtering chamber therebetween, a filter within the annular filtering chamber and having its bottom supported by said member, a cover for said casing, a supply connection carried by said cover and arranged to discharge within the inner filter, a receiving chamber for the filtered oil below said bottom plate.

8. In a combined filtering and cooling apparatus for motor vehicles, the combination of a casing, a filtering device in the upper portion of the casing, a receptacle in the lower portion of said casing, air tubes extending through said casing below the filtering device and adapted to permit the circulation of air therethrough when the vehicle is moving, a storage receptacle below the filtering device and between the filtering device and the receptacle in the lower portion of the casing, and connections whereby oil filtered in the filtering device may be discharged into the lower receptacle and thence into the storage receptacle.

In testimony whereof, I hereunto affix my signature in the presence of two witnesses.

HARVEY F. MARANVILLE.

Witnesses:
J. B. HULL,
E. R. CASPELL.